United States Patent
Zhou et al.

(10) Patent No.: US 11,493,817 B2
(45) Date of Patent: Nov. 8, 2022

(54) SELF-HEATING ELECTROCHROMIC DEVICE AND MANUFACTURE THEREOF

(71) Applicant: FURCIFER INC., Fremont, CA (US)

(72) Inventors: Yan Zhou, Fremont, CA (US); Jian Wang, Fremont, CA (US); Guangming Wang, Huntington Beach, CA (US)

(73) Assignee: FURCIFER INC.

( * ) Notice: Subject to any disclaimer, the term of this patent is extended or adjusted under 35 U.S.C. 154(b) by 102 days.

(21) Appl. No.: 16/918,419

(22) Filed: Jul. 1, 2020

(65) Prior Publication Data

US 2022/0004072 A1  Jan. 6, 2022

(51) Int. Cl.
| | |
|---|---|
| G02F 1/15 | (2019.01) |
| G02F 1/153 | (2006.01) |
| G02F 1/1333 | (2006.01) |
| G02F 1/155 | (2006.01) |
| G02F 1/1503 | (2019.01) |

(52) U.S. Cl.
CPC ...... *G02F 1/1533* (2013.01); *G02F 1/133382* (2013.01); *G02F 1/155* (2013.01); *G02F 1/153* (2013.01); *G02F 1/1503* (2019.01); *G02F 2001/164* (2019.01); *G02F 2203/21* (2013.01)

(58) Field of Classification Search
CPC .. G02F 1/1533; G02F 1/133382; G02F 1/155; G02F 1/1503; G02F 1/153; G02F 2001/164; G02F 2203/21
USPC .................................................. 359/265–275
See application file for complete search history.

(56) References Cited

U.S. PATENT DOCUMENTS

| | | |
|---|---|---|
| 5,353,148 A | 10/1994 | Eid et al. |
| 10,429,712 B2 * | 10/2019 | Jack ........................ G02F 1/155 |
| 2003/0227663 A1 | 12/2003 | Agrawal et al. |

(Continued)

FOREIGN PATENT DOCUMENTS

| | | |
|---|---|---|
| JP | S61-245143 A | 10/1986 |
| JP | H02-095322 U | 7/1990 |
| JP | H05-203999 A | 8/1993 |

(Continued)

OTHER PUBLICATIONS

Search Report for European Application No. 21182953.6, dated Nov. 11, 2021, 9 pages.

(Continued)

*Primary Examiner* — Mahidere S Sahle

(57) ABSTRACT

A self-heating electrochromic device and related manufacturing methods are provided. The electrochromic device includes a bottom electrode layer and a bottom substrate attached to each other; a top electrode layer and a top substrate attached to each other; an electrochromic layer, an electrolyte layer, and a charge storage layer sandwiched by the bottom electrode layer and the top electrode layer. Two first high conductive bars may be respectively provided on two edges of the bottom electrode layer, and two second high conductive bars may be respectively provided on two edges of the top electrode layer. The first and second high conductive bars may be configured to generate a current in the electrode layer in response to a voltage, and thus increase the temperature of the electrochromic device, thereby improving the switching speed of the electrochromic device in a low temperature environment.

17 Claims, 9 Drawing Sheets

(56) References Cited

U.S. PATENT DOCUMENTS

2013/0278988 A1   10/2013   Jack et al.
2018/0100056 A1    4/2018   Wang et al.

FOREIGN PATENT DOCUMENTS

| JP | 2000-506278 A | | 5/2000 | |
|----|---------------|---|--------|---|
| JP | 2015-060109 A | | 3/2015 | |
| JP | 2016-507082 A | | 3/2016 | |
| KR | 2018034869 A | * | 4/2018 | ............. G02F 1/155 |
| KR | 2021002169 A | * | 1/2021 | ........... G02F 1/1533 |
| WO | 9731291 A1 | | 8/1997 | |
| WO | 2014121263 A1 | | 8/2014 | |

OTHER PUBLICATIONS

Notice of Reasons for Rejection for Japanese Application No. 2021-109854 dated Aug. 9, 2022.

* cited by examiner

SELF-HEATING ELECTROCHROMIC DEVICE AND MANUFACTURE THEREOF

TECHNICAL FIELD

This application relates generally to technical field of electronics, and more specifically, to a self-heating electrochromic device and its manufacturing method.

BACKGROUND

Electrochromism generally refers to a reversible change in optical properties of a material upon application of a voltage. In particular, electrochromic materials exhibit a reversible transparency change due to an electrochemical reduction-oxidation (redox) reaction caused by application of an electric field. Electrochromic materials may include both organic and inorganic materials. For their adjustable optical characteristics, electrochromic materials have been adopted in various devices to provide adjustable lighting conditions. For example, dimmable mirrors and dimmable windows that are made of electrochromic materials, known as smart glass/window or switchable glass/window, have been ubiquitously used in vehicles, airplanes, and buildings.

The speed at which electrochromic materials can change their optical characteristics (i.e., the "switching speed") is determined by the mobility of ions in its electrolyte layer, and is affected by the temperature. A low temperature (e.g., lower than 0° C.) not only slows down the ions movements, resulting in a slower switching speed, but also reduces the range of transparency the electrochromic materials can reach. Thus, the performance of smart glasses/windows may be degraded as the temperature drops. Since many smart glasses/windows, such as those for windows of buildings or vehicles, may be exposed to an environment of low temperatures (e.g., subfreezing temperatures), an electrochromic device that can withstand a low temperature environment without sacrificing its performance is highly desirable.

SUMMARY

In view of the limitations of conventional technologies described above, this specification provides a self-heating electrochromic device and related manufacturing methods that address these limitations.

This specification first provides an electrochromic device. The electrochromic device may include a bottom substrate and a bottom electrode layer attached to each other; a top substrate and a top electrode layer attached to each other; an electrochromic layer disposed on an interior surface of the bottom electrode layer; a charge storage layer disposed on an interior surface of the top electrode layer; an electrolyte layer disposed between the electrochromic layer and the charge storage layer and sandwiched by the electrochromic layer and the charge storage layer. The bottom electrode layer, the electrochromic layer, the electrolyte layer, the charge storage layer, and the top electrode layer may be sandwiched by the bottom substrate and the top substrate. The bottom electrode layer and the top electrode layer may be configured to accept a transition voltage to cause a change on an optical transmittance of the electrochromic device.

The electrochromic device may further include two first high conductive bars located on a surface of the bottom electrode layer away from the bottom substrate. The two first high conductive bars may be configured to, in response to a first thermal voltage applied on the first high conductive bars, generate a current in the bottom electrode layer to change a temperature of the electrochromic device.

In some embodiments, the aforementioned electrochromic device may further include two second high conductive bars located on a surface of the top electrode layer away from the top substrate. The two second high conductive bars may be configured to, in response to a second thermal voltage applied on the second high conductive bars, generate a current in the top electrode layer to change the temperature of the electrochromic device.

In some embodiments, the first high conductive bars and the second high conductive bars may each be made of a conductive paste, a conductive tape, or an embedded metal wire.

In some embodiments, the first high conductive bars may be located along edges of the bottom electrode layer, respectively, and the second high conductive bars may be located along edges of the top electrode layer, respectively.

In some embodiments, projections of the first high conductive bars and the second high conductive bars on a plane parallel with the bottom electrode layer may be separated from each other.

In some embodiments, the two first high conductive bars may be parallel with each other and respectively located along two opposing edges of the bottom electrode layer. The two second high conductive bars may be parallel with each other and respectively located along two opposing edges of the top electrode layer.

In some embodiments, the two first high conductive bars may be respectively located along two adjacent edges of the bottom electrode layer. The two second high conductive bars may be respectively located along two adjacent edges of the top electrode layer.

In some embodiments, the electrolyte layer may be a solid polymer electrolyte layer including one or more polar crystalline polymers and one or more polar amorphous polymers. A total amount of polar crystalline polymers may be in a range of 0 wt. % to 60 wt. % of a total weight of the solid polymer electrolyte layer, and a total amount of polar amorphous polymers may be in a range of 0 wt. % to 70 wt. % of the total weight of the solid polymer electrolyte layer.

This specification further provides another electrochromic device. The electrochromic device may include: a bottom heater electrode layer and a bottom optical electrode layer respectively attached to an exterior surface and an interior surface of a bottom substrate; a top heater electrode layer and a top optical electrode layer respectively attached to an exterior surface and an interior surface of a top substrate; an electrochromic layer disposed on an interior surface of the bottom optical electrode layer; a charge storage layer disposed on an interior surface of the top optical electrode layer; and an electrolyte layer disposed between the electrochromic layer and the charge storage layer and sandwiched by the electrochromic layer and the charge storage layer. The bottom optical electrode layer, the electrochromic layer, the electrolyte layer, the charge storage layer, and the top optical electrode layer may be sandwiched by the bottom substrate and the top substrate. The bottom optical electrode layer and the top optical electrode layer may be configured to accept a transition voltage to cause a change on an optical transmittance of the electrochromic device.

The electrochromic device may further include two first high conductive bars located on a surface of the bottom heater electrode layer away from the bottom substrate. The two first high conductive bars may be configured to, in response to a first thermal voltage applied on the first high conductive bars, generate a current in the bottom heater electrode layer to change a temperature of the electrochromic device.

In some embodiment, the electrochromic device may further include two second high conductive bars located on a surface of the top heater electrode layer away from the top substrate. The two second high conductive bars may be configured to, in response to a second thermal voltage applied on the second high conductive bars, generate a current in the top heater electrode layer to change the temperature of the electrochromic device.

In some embodiments, the first high conductive bars and the second high conductive bars may be each made of a conductive paste, a conductive tape, or an embedded metal wire.

In some embodiments, the first high conductive bars may be located along edges of the bottom heater electrode layer, respectively, and the second high conductive bars may be located along edges of the top heater electrode layer, respectively.

In some embodiments, the electrolyte layer may be a solid polymer electrolyte layer including one or more polar crystalline polymers and one or more polar amorphous polymers. A total amount of polar crystalline polymers may be in a range of 0 wt. % to 60 wt. % of a total weight of the solid polymer electrolyte layer, and a total amount of polar amorphous polymers may be in a range of 0 wt. % to 70 wt. % of the total weight of the solid polymer electrolyte layer.

This specification further provides an electrochromic device manufacturing method. The method may include: forming a bottom substrate and a bottom electrode layer attached to each other; forming two first high conductive bars on a surface of the bottom electrode layer away from the bottom substrate; forming a top substrate and a top electrode layer attached to each other; and forming an electrochromic layer, an electrolyte layer, and a charge storage layer sandwiched by the bottom electrode layer and the top electrode layer. The electrolyte layer may be sandwiched by the electrochromic layer and the charge storage layer. The bottom electrode layer, the electrochromic layer, the electrolyte layer, the charge storage layer, and the top electrode layer may be sandwiched by the bottom substrate and the top substrate.

The two first high conductive bars may be configured to, in response to a first thermal voltage applied on the first high conductive bars, generate a current in the bottom electrode layer to change a temperature of the electrochromic device. The bottom electrode layer and the top electrode layer may be configured to accept a transition voltage to cause a change on an optical transmittance of the electrochromic device.

In some embodiments, the aforementioned method may further include forming two second high conductive bars on a surface of the top electrode layer away from the top substrate. The two second high conductive bars may be configured to, in response to a second thermal voltage applied on the second high conductive bars, generate a current in the top electrode layer to change the temperature of the electrochromic device.

In some embodiments, the first high conductive bars and the second high conductive bars may each be made of a conductive paste, a conductive tape, or an embedded metal wire.

In some embodiments, the first high conductive bars may be formed along edges of the bottom electrode layer, respectively, and the second high conductive bars may be formed along edges of the top electrode layer, respectively.

In some embodiments, projections of the first high conductive bars and the second high conductive bars on a plane parallel with the bottom electrode layer may be separated from each other.

In some embodiments, the forming two first high conductive bar on a surface of the bottom electrode layer away from the bottom substrate may include: forming the two first high conductive bars parallel with each other and respectively along two opposing edges of the bottom electrode layer. The forming two second high conductive bars on a surface of the top electrode layer away from the top substrate may include: forming the two second high conductive bars parallel with each other and respectively along two opposing edges of the top electrode layer.

In some embodiments, the forming two first high conductive bar on a surface of the bottom electrode layer away from the bottom substrate may include: forming the two first high conductive bars respectively along two adjacent edges of the bottom electrode layer. The forming two second high conductive bars on a surface of the top electrode layer away from the top substrate may include: forming the two second high conductive bars respectively along two adjacent edges of the top electrode layer.

In the electrochromic device disclosed in this specification, two high conductive bars may be provided respectively along two edges of the top electrode layer and/or the bottom electrode layer. When a thermal voltage is applied on the high conductive bars, the electrode layer(s) may work as heating element(s) to heat the electrochromic device. When the environmental temperature is lower than an optimal operating temperature, the heat generated by the electrode layer(s) may increase the operating temperature, thereby improving the switching speed and the performance of the electrochromic device.

These and other features of the systems, methods, as well as the methods of operation and functions of the related elements of structure will become more apparent upon consideration of the following description and the appended claims with reference to the accompanying drawings, all of which form a part of this specification. Like reference numerals in the drawings may designate corresponding parts in the various figures. It is to be expressly understood that the drawings are for purposes of illustration and description only and are not intended as a definition of the limits of the specification. It is to be understood that the foregoing general description and the following detailed description are exemplary and explanatory only, and are not restrictive of the specification, as claimed.

BRIEF DESCRIPTION OF THE DRAWINGS

Preferred and non-limiting embodiments of this specification may be more readily understood by referring to the accompanying drawings. The accompanying drawings, which are incorporated in and constitute a part of the description, illustrate embodiments in accordance with this specification and, together with the description, serve to explain the disclosed specification. It is apparent that these drawings present only some embodiments of the specification and persons of ordinary skill in the art may obtain drawings of other embodiments from them without creative effort.

DETAILED DESCRIPTION OF THE INVENTION

Specific, non-limiting embodiments of the present invention will now be described with reference to the drawings. Particular features and aspects of any embodiment disclosed herein may be used and/or combined with particular features and aspects of any other embodiment disclosed herein. It should be understood that such embodiments are by way of example and are merely illustrative of a number of embodiments within the scope of the present invention. Various changes and modifications obvious to one skilled in the art to which the present invention pertains are deemed to be within the spirit, scope and contemplation of the present invention as further defined in the appended claims.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the appended claims, along with the full range of equivalents to which such claims are entitled.

Figure 1:
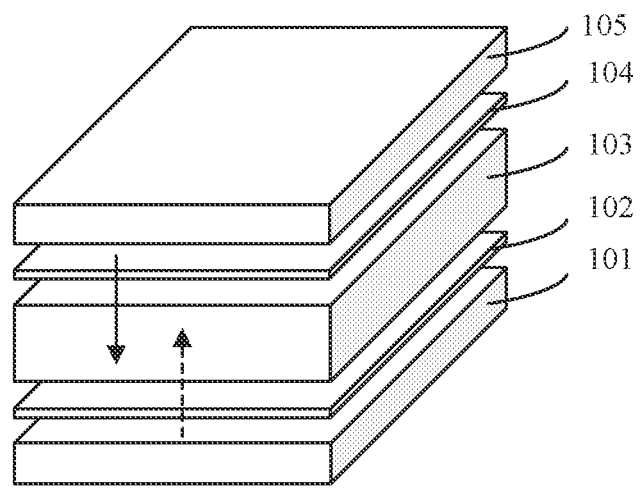
FIG. 1 is a diagram illustrating an electrochromic device.

FIG. 1 is a diagram illustrating an electrochromic device. Referring to FIG. 1, the electrochromic device 100 may include an electrolyte layer 103 that is sandwiched by an electrochromic layer 102 and a charge storage layer 104. These three layers may be further sandwiched by two conductive substrates, i.e., a bottom conductive substrate 101 and a top conductive substrate 105, as shown in FIG. 1.

The electrochromic device 100 is a current-driving device. When a voltage is applied on the conductive substrates, the electrons, driven by the electric field established between the conductive substrates, may be injected into the electrochromic layer 102 and change the redox state of the material, resulting in a change in the optical transmittance of the electrochromic layer 102. Meanwhile, ions in the electrolyte layer 103 may move towards the charge storage layer 104 and the electrochromic layer 102 to compensate the change of the redox state. The arrows in FIG. 1 indicate the current direction through the electrochromic device.

Figure 2:
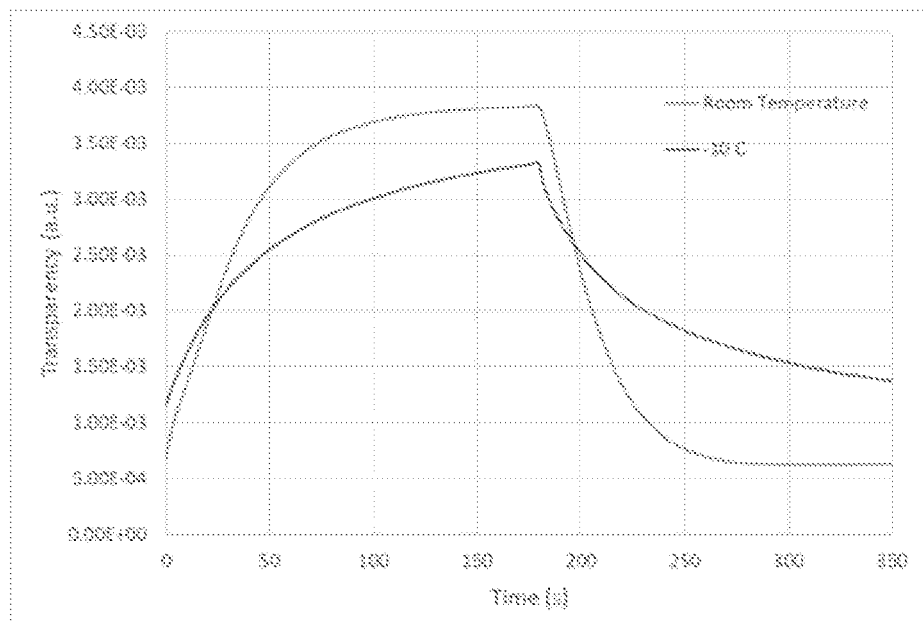
FIG. 2 is a diagram illustrating the change of transparency of an electrochromic device over time at different temperatures.

An electrolyte is necessary in electrochromic device to provide mobile ions to dope or de-dope the electrochromic material. The intrinsic switching speed of an electrochromic device is determined by the ion conductivities. With faster mobile ions, the ions could reach the electrochromic layer from the electrolyte layer in a shorter time. The speed of the ions depends on several factors, one of which is the temperature. It's widely known that low temperature freezes the movement of the ions, making it difficult to reach the electrochromic layer. FIG. 2 is a diagram illustrating the change of transparency of an electrochromic device over time at different temperatures. As shown in FIG. 2, a low temperature (e.g., −10° C.) not only causes the transparency of an electrochromic device to change slower compared to the counterpart operated at a room temperature, it also reduces the range of the transparency.

Smart glasses in buildings and vehicles frequently work in operating temperatures that are well below zero Celsius degree, and are expected to maintain the same switching speed as that in room temperature. Low operating temperature, however, may slow down the switching speed, and thus adversely affect the performance of the smart glasses. To overcome the slow movement of the ions at low temperature, this specification provides a self-heating electrochromic device that includes an internal heating mechanism, which may increase the temperature of the electrochromic device at a low temperature, thereby restoring the switching speed of the device.

Figure 3:
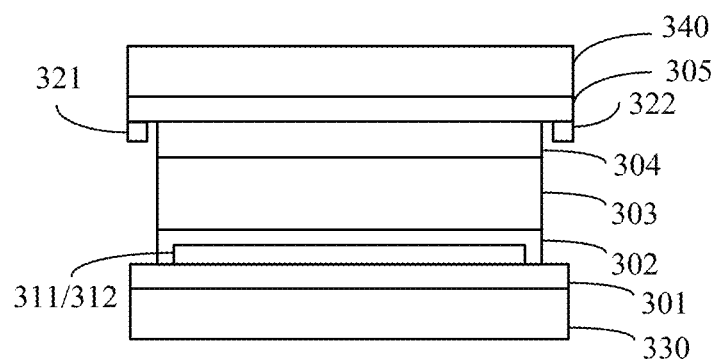
FIG. 3 is a schematic diagram illustrating an electrochromic device in accordance with one or more embodiments of this specification.
Figure 4A:
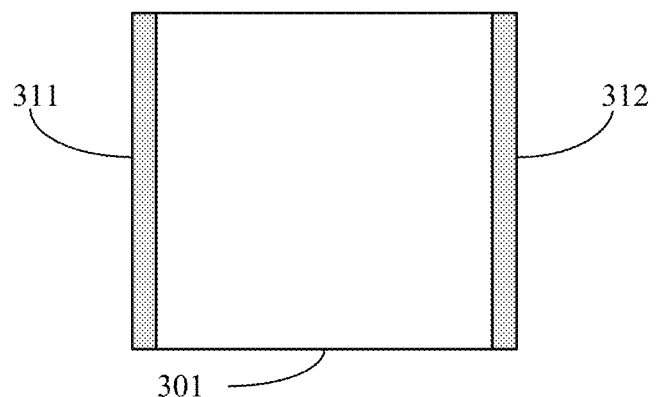
FIGS. 4A and 4B are cross-sectional views of an electrode layer with high conductive bars in an electrochromic device in accordance with one or more embodiments of this specification.
Figure 4B:
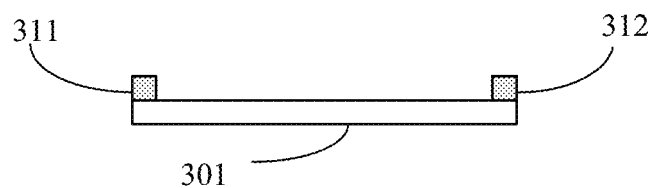
Figure 5A:
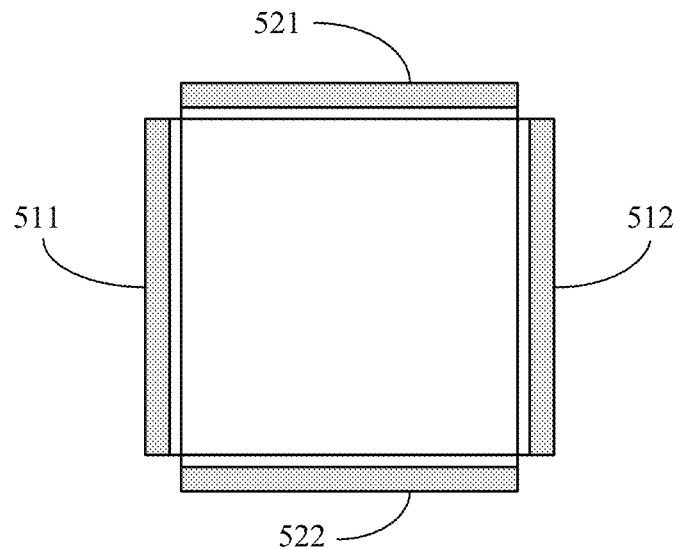
FIGS. 5A and 5B are top plan views of electrochromic devices in accordance with one or more embodiments of this specification.
Figure 5B:
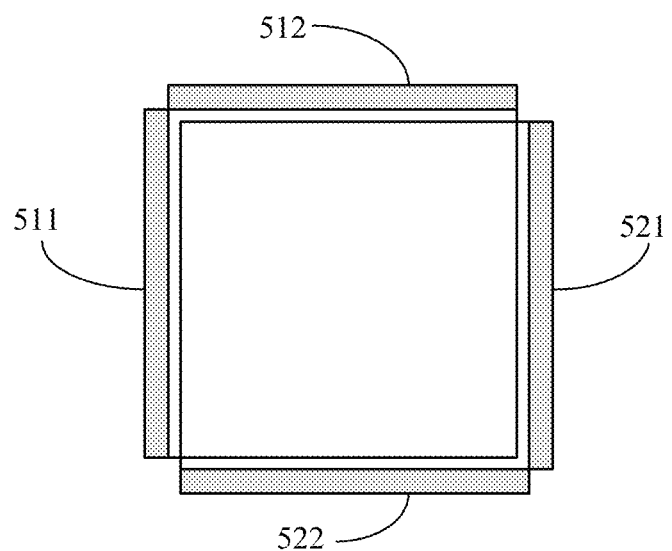

FIG. 3 is a schematic diagram illustrating an electrochromic device in accordance with one or more embodiments of this specification. FIGS. 4A and 4B are cross-sectional views of an electrode layer with high conductive bars in the electrochromic device. FIGS. 5A and 5B are top plan views of the electrochromic devices in accordance with one or more embodiments of this specification. The electrochromic device will be described below in details with reference to these drawings.

As shown in FIG. 3, in one embodiment, the electrochromic device 300 may include a bottom electrode layer 301 and a bottom substrate 330 attached to each other; a top substrate 340 and a top electrode layer 305 attached to each other; and an electrochromic layer 302 disposed on an interior surface of the bottom electrode layer 301; a charge storage layer 304 disposed on an interior surface of the top electrode layer 305; and an electrolyte layer 303 disposed between the electrochromic layer 302 and the charge storage layer 304 and sandwiched by the electrochromic layer 302 and the charge storage layer 304. The bottom electrode layer 301, the electrochromic layer 302, the electrolyte layer 303, the charge storage layer 304, and the top electrode layer 305 may be sandwiched by the bottom substrate 330 and the top substrate 340.

The electrochromic device 300 further includes two first high conductive bars 311/312 respectively provided on a surface of the bottom electrode layer 301 away from the bottom substrate 330 (note that, in FIG. 3, one of the two first high conductive bars 311/312 is occluded, so only one is shown). The bottom substrate 330 may be attached to the exterior surface of the bottom electrode layer 301, and the top substrate 340 may be attached to the exterior surface of the top electrode layer 305.

The two first high conductive bars 311/312 may be provided along two edges of the bottom electrode layer 301, and configured to generate a current in the bottom electrode layer 301 in response to an external voltage (i.e., a first thermal voltage) applied on the first high conductive bars 311/312. The current in the bottom electrode layer 301 may heat the electrochromic device 300. The bottom electrode layer 301 and the top electrode layer 305 may be configured to accept a voltage (i.e., a transition voltage) to cause a change on the optical transmittance of the electrochromic device 300.

In this specification, "exterior surface" of an electrode layer refers to the surface of the electrode layer facing away from the interior of the electrochromic device 300 (e.g., the electrolyte layer 303), and "interior surface" of an electrode layer refers to a surface of the electrode layer facing towards the interior of the electrochromic device 300. Therefore, as shown in FIG. 3, since the surface of the bottom electrode layer 301 away from the bottom substrate 330 is the interior surface of the bottom electrode layer 301, the two first high conductive bars 311/312 are located on the interior surface of the bottom electrode layer 301.

The bottom electrode layer 301 and the top electrode layer 305 may each be transparent in at least part of the visible regions of the electromagnetic spectrum. They may have the same or different dimensions and comprise the same or different material. The bottom electrode layer 301 and the top electrode layer 305 may also each independently have a single layer or multilayer structure. Suitable material for the bottom electrode layer 301 and the top electrode layer 305 may include, but is not limited to, tin doped indium oxide (ITO), fluorine doped indium oxide, antimony doped indium oxide, zinc doped indium oxide (IZO), aluminum doped zinc oxide, silver nanowires, carbon nanotube films, patterned metals on glass or plastic substrates, metal mesh, metal grid, dielectric metal dielectric (DMD), combinations thereof, and/or other such transparent material exhibiting sufficient electrical conductance. In preferred aspects, the bottom electrode layer 301 and the top electrode layer 305 may comprise ITO.

The electrochromic layer 302 may include one or more electrochromic materials. Suitable electrochromic materials for the electrochromic layer 302 may include, but not limited to, inorganic material, conjugated polymers, small organic molecules, metal salts, combinations thereof, etc. In some embodiments, the electrochromic material of the electrochromic layer 302 may include a metal oxide such as $MoO_3$, $V_2O_5$, $Nb_2O_5$, $WO_3$, $TiO_2$, $Ir(OH)_x$, $SrTiO_3$, $ZrO_2$, $La_2O_3$, $CaTiO_3$, sodium titanate, potassium niobate, combinations thereof, etc. In some embodiments, the electrochromic material of the electrochromic layer 302 may include a metal salt (e.g., $FeCl_3$, etc.). In some embodiments, the electrochromic material of the electrochromic layer 302 may include a conductive polymer such as poly-3,4-ethylenedioxy thiophene (PEDOT), poly-2,2'-bithiophene, polypyrrole, polyaniline (PANI), polythiopene, polyisothianaphthene, poly(α-aminophenol), polypyridine, polyindole, polycarbazole, polyquinone, octacyanophthalocyanine, combinations thereof, etc. Moreover, the electrochromic material of the electrochromic layer 302 may include materials such as viologen, anthraquinone, phenocyazine, combinations thereof, etc.

The first high conductive bars 311/312 may each be made of conductive materials. For example, the first high conductive bars 311/312 may be conductive paste such as silver paste, conductive tapes, or embedded metal wires formed along one or more edges of the corresponding electrode layers.

In some embodiments, as shown in FIG. 3, in additional to the first high conductive bars 311/312 respectively provided on two edges of the bottom electrode layer 301, the electrochromic device 300 may further include two second high conductive bars 321/322 respectively provided on a surface of the top electrode layer 305 away from the top substrate 340. More specifically, the two second high conductive bars 321/322 may be provided along two edges of the top electrode layer 305. The two second high conductive bars 321/322 may be configured to generate a current in the top electrode layer 305 in response to an external voltage (e.g., a second thermal voltage) applied on the second high conductive bars 321/322. The current in the top electrode layer 305 may heat the electrochromic device 300. The second high conductive bars 321/322 may be made of the same material of the first high conductive bars 311/312. Since the surface of the top electrode layer 305 away from the top substrate 340 is the interior surface of the top electrode layer 305, the two second high conductive bars 321/322 are located on the interior surface of the top electrode layer 305.

The first thermal voltage may be the same as or different from the second thermal voltage, and this specification is not limited in this regard. For ease of the description, in some parts of this specification, the voltage applied on the first high conductive bars 311/312 (i.e., the first thermal voltage) or that applied on the second high conductive bars 321/322 (i.e., the second thermal voltage) may be generally referred to as "the thermal voltage." However, it should be understood that, in some embodiments, these two voltages may be different.

In some embodiments, the electrolyte layer 303 may be made of solid polymer electrolyte. That is, the electrolyte layer 303 may be a solid polymer electrolyte layer. The solid polymer electrolyte layer may include a framework of one or more polar crystalline polymers, one or more polar amorphous polymers, and one or more electrolyte salts. In some embodiments, one or more of the one or more polar crystalline polymers or the one or more polar amorphous polymers are ionic conductive. In some embodiments, the solid polymer electrolyte may be formed by microphase separation of the components.

The one or more polar crystalline polymers may include one or more of: C, N, F, O, H, P, etc. In some embodiments, the one or more polar crystalline polymers may have an average molecular weight of about 10,000 Daltons or greater. Suitable polar crystalline polymers may include, but are not limited to, Nylon, Polyethylene terephthalate, Poly (methyl methacrylate) (PMMA), polyacrylamide, polyimide, polyvinylchloride (PVC), Polybutylene terephthalate (PBT), Polyether ether ketone (PEEK), Polytetrafluoroethylene (PTFE), Polyvinylidene fluoride (PVDF), Poly(vinylidene fluoride-co-hexafluoropropylene) (PVDF-HFP), high molecular weight polyethylene oxide, polyphenylene sulfide, polyetherimide, polyethersulfone, combinations thereof, etc. In embodiments where a plurality of polar crystalline polymers are present, the polar crystalline polymers may be crosslinked to form a network having enhanced mechanical properties. In some embodiments, the total amount of polar crystalline polymers may be in a range from about 0 wt. % to about 60 wt. % based on the total weight of the solid polymer electrolyte.

The one or more polar amorphous polymers may include one or more of: C, N, O, F, H, P, Si, etc. In some embodiments, the one or more polar amorphous polymers have low crystallinity. The one or more polar amorphous polymers may have a glass transition temperature (Tg) of −20° C. or lower. Suitable polar amorphous polymers may include, but are not limited to, polyureathane, polysiloxane, polyethylene oxide, branched polymers, combinations thereof, etc. In some embodiments, one or more of the polar amorphous polymers may have a sufficient amorphicity so as to achieve sufficient ionic conductivity. In some embodiments, the total amount of polar amorphous polymers may be in a range from about 0 wt. % to about 70 wt. % based on the total weight of the solid polymer electrolyte.

As noted above, the solid polymer electrolyte may include one or more electrolyte salts. In some embodiments, the one or more electrolyte salts may comprise one or more organic salts. In some embodiments, the one or more electrolyte salts may comprise one or more inorganic salts (e.g., metal salts). Suitable electrolyte salts may include, but are not limited to, $LiTFSI$, $LiPF_6$, $LiBF_4$, $LiClO_4$, $LiCF_3SO_3$, $LiN(CF_3SO_2)_2$, $LiSbF_6$, $LiAsF_6$, $LiN(CF_3CF_2SO_2)_2$, $(C_2H_5)_4NBF_4$, $(C_2H_5)_3CH_3NBF_4$, $LiI$, combinations thereof, etc. In some embodiments, the total amount of electrolyte salt may be in a range from about 10 wt. % to about 50 wt. % based on the total weight of the solid polymer electrolyte.

In some embodiments, the one or more polar amorphous polymers and the one or more electrolyte salts may be substantially miscible with the framework of the one or more polar crystalline polymers. Preferably, the components of the solid polymer electrolyte may be compatible with each other and can be blended (e.g., via solution processing or extrusion) into a transparent film without any observable particles.

The solid polymer electrolyte is distinguishable from conventional liquid electrolytes, as well as gel polymer electrolytes including an ionic liquid therein. In other words, the presently disclosed solid polymer electrolyte may be an all solid polymer electrolyte, and does not include any liquid or gel components therein. The presently disclosed solid polymer electrolyte may also be transparent in some aspects. For example, the presently disclosed solid polymer electrolyte may have a transparency of 80% or higher. Additionally, the solid polymer electrolyte may have an ionic conductivity in a range from about $10^{-6}$ S/cm to about $10^{-3}$ S/cm.

The electrochromic device 300 may additionally include electrical power supplies (not shown) configured to supply the transition voltage between the bottom electrode layer 301 and the top electrode layer 305, and the first thermal voltage between the first high conductive bars 311/312 and/or the second thermal voltage between the second high conductive bars 321/322.

In some embodiments, the two first high conductive bars 311/312 may be parallel with each other. For the electrochromic device 300 that includes two second high conductive bars 321/322, the second high conductive bars 321/322 may be parallel with each other. In some other examples, the two first high conductive bars 311/312 may not be parallel with each other, and the two second high conductive bars 321/322 may not be parallel with each other. This specification is not limited in this regard.

The two first high conductive bars 311/312 may be provided respectively along two opposing edges of the bottom electrode layer 301, and the two second high conductive bars 321/322 may be provided respectively along two opposing edges of the top electrode layer 305. FIG. 4A is a cross-sectional view of the bottom electrode layer 301 and the first high conductive bars 311/312. As shown in FIG. 4A, the two first high conductive bars 311/312 may be parallel with each other and respectively provided along the left and the right edges of the bottom electrode layer 301.

FIG. 4B shows another cross-sectional view of the structure of FIG. 4A. As shown in FIG. 4B, the two first high conductive bars 311/312 may be attached to the interior surface of the bottom electrode layer 301. By applying the first thermal voltage between the first high conductive bars 311/312, an electrical field may be generated in the bottom electrode layer 301 between the first high conductive bars 311/312. The bottom electrode layer 301 has a finite conductivity, and thus is basically a resistor. Therefore the bottom electrode layer 301 may generate heat as a current flowing between the first high conductive bars 311/312. In this process, the bottom electrode layer 301 may work as a heat generating element for the electrochromic device. According to specific working conditions and requirements, a proper first thermal voltage may be chosen, so that the bottom electrode layer 301 may generate sufficient heat to keep the electrochromic device in a desired operating temperature.

If the electrochromic device 300 includes two second high conductive bars 321/322. The two second high conductive bars 321/322 may be respectively provided along two opposing edges of the top electrode layer 305. The second high conductive bars 321/322 may be provided on the top electrode layer 305 in a similar manner as the first high conductive bars 311/312 being provided on the bottom electrode layer 301, thus relevant parts in the foregoing descriptions may be referred to for details, which are not repeatedly presented herein for the sake of conciseness.

It should be understood that FIGS. 4A and 4B only show one possible arrangement of the high conductive bars on the electrode layer, and are not intended to be limiting. The number, specific shapes, and relative positions of the high conductive bars are not limited by this example. In some examples, more than two (e.g., four, six, or eight) high conductive bars may be provided along the edges of the electrode layer, and the high conductive bars may be provided on the top of, on the side to, or beneath the bottom of an electrode layer according to specific requirements.

In some embodiments, the electrochromic device 300 may include both the first high conductive bars 311/312 and the second high conductive bars 321/322. To prevent short circuit between the bottom electrode layer 301 and the top electrode layer 305 through the high conductive bars positioned along the edges of the electrode layers, the projections of the first high conductive bars 311/312 and the second high conductive bars 321/322 on a plane parallel with the bottom electrode layer 301 may be separated from each other.

FIGS. 5A and 5B are top plan views of two exemplary electrochromic devices of this specification. In one example, as shown in FIG. 5A, two first high conductive bars 511/512 may be respectively provided along two opposing edges (i.e., left and right edges in FIG. 5A) of the bottom electrode layer. Two second high conductive bars 521/522 may be respectively provided along two opposing edges (i.e., top and bottom edges in FIG. 5A) of the top electrode layer. To avoid short circuit between the bottom electrode layer and the top electrode layer, the first high conductive bars 511/512 and the second high conductive bars 521/522 may be provided on different edges of the corresponding electrode layer in the top plan view. That is, the projections of the first high conductive bars 511/512 and the second high conductive bars 521/522 on the a plane parallel with the bottom electrode layer are separated from each other. More specifically, when viewed from a direction perpendicular to the interior surface of the bottom electrode layer, the first high conductive bars 511/512, and the second high conductive bars 521/522 are separated from each other, as shown in FIG. 5A.

In another example, as shown in FIG. 5B, the two first high conductive bars 511/512 may be respectively provided on two adjacent edges (i.e., left and top edges in FIG. 5B) of the bottom electrode layer, and form a "L" shape pattern. The two second high conductive bars 521/522 may be respectively provided on two adjacent edges (i.e., right and bottom edges in FIG. 5B) of the top electrode layer, and form a "L" shape pattern. To avoid short circuit between the top electrode layer and the bottom electrode layer, the projections of the two first high conductive bars 511/512 and the two second high conductive bars 521/522 on a plane parallel with the bottom electrode layer may be separated from each other. More specifically, when viewed from a direction perpendicular to the top surface (i.e., the interior surface) of the bottom electrode layer, the first high conductive bars 511/512, and the second high conductive bars 521/522 may be separated from each other, as shown in FIG. 5B.

Figure 6:
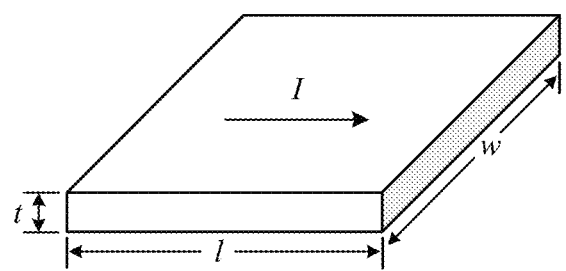
FIG. 6 is a three-dimensional (3-D) diagram illustrating an electrode layer in an electrochromic device in accordance with one embodiment of this specification.

The thermal voltage may be determined based on factors such as the size of the electrode layer, the environmental temperature, and the resistance between the high conductive bars. To facilitate the description, FIG. 6 shows an exemplary electrode layer that has a length of l, a width of w, and a thickness of t. Assuming that two first high conductive bars (not shown in FIG. 6) are respectively provided along the left and right edges of the electrode layer, when the thermal voltage is applied between the two high conductive bars, the current I may flow from left to right, as shown in FIG. 6. The resistance R of the electrode layer may be determined by:

$$R = \rho \frac{l}{tw} = \frac{\rho}{t} \frac{l}{w} = R_s \frac{l}{w}$$

where $\rho$ is the resistivity, and $R_s$ is the sheet resistance. The heat power P generated by the electrode layer may be determined by:

$$P = \frac{V^2}{R} = \frac{V^2}{R_s} \frac{w}{l}$$

where V is the thermal voltage.

In some embodiments, the resistance between the two first high conductive bars may be in a range of 1-100Ω, the resistance between the two second high conductive bars may be in a range of 1-100Ω, and the thermal voltage may be in a range of 1-100 V. Apparently, these settings are just one setting that can be used for the electrochromic device of this specification and are not intended to be limiting. These values may be adjusted according to specific needs.

In the aforementioned embodiments, each of the top electrode layer and the bottom electrode layer is responsible for inducing optical change and generating heat. That is, on one hand, a transition voltage may be applied between the top and the bottom electrode layers to generate an electrical field therebetween to drive the electrons/ions movement, resulting in a change of the optical characteristics of the electrochromic device. On the other hand, each of the top electrode layer and the bottom electrode layer may work as a heat generating element. When a thermal voltage is applied on the high conductive bars provided along the edges of an electrode layer, a current may be generated within the electrode layer, and the electrode layer may work as a heating element to heat the electrochromic device. When the environmental temperature is lower than an optimal operating temperature, the heat generated by the electrode layer may increase the operating temperature, thereby improving the switching speed and the performance of the electrochromic device.

This specification further provides another electrochromic device. This electrochromic device has similar structure and composition with the electrochromic devices in the foregoing embodiments except that, instead of using one type of electrode layer, two types of electrode layers are provided in this electrochromic device, one dedicated for optical change inducing purpose, and the other dedicated for heat generating purpose.

More specifically, the electrochromic device may include: a bottom heater electrode layer and a bottom optical electrode layer respectively attached to an exterior surface and an interior surface of a bottom substrate; a top heater electrode layer and a top optical electrode layer respectively attached to an exterior surface and an interior surface of a top substrate; an electrochromic layer disposed on an interior surface of the bottom optical electrode layer; a charge storage layer disposed on an interior surface of the top optical electrode layer; an electrolyte layer disposed between the electrochromic layer and the charge storage layer and sandwiched by the electrochromic layer and the charge storage layer. The bottom optical electrode layer, the electrochromic layer, the electrolyte layer, the charge storage layer, and the top optical electrode layer may be sandwiched by the bottom substrate and the top substrate. The bottom optical electrode layer and the top optical electrode layer may be configured to accept a transition voltage to cause a change on an optical transmittance of the electrochromic device.

The electrochromic device may further include two first high conductive bars located on a surface of the bottom heater electrode layer away from the bottom substrate. The two first high conductive bars may be configured to, in response to a first thermal voltage applied on the first high conductive bars, generate a current in the bottom heater electrode layer to change a temperature of the electrochromic device.

In some embodiments, the electrochromic device may further include two second high conductive bars located on a surface of the top heater electrode layer away from the top substrate. The two second high conductive bars may be configured to, in response to a second thermal voltage applied on the second high conductive bars, generate a current in the top heater electrode layer to change the temperature of the electrochromic device.

The two first high conductive bars may be respectively provided along two edges of the bottom heater electrode layer on a surface of the bottom heater electrode layer away from the bottom substrate. The two second high conductive bars may be respectively provided along two edges of the top heater electrode layer on a surface of the top heater electrode layer away from the top substrate.

Relevant parts in the description of the electrochromic devices in the foregoing embodiments may be referred to for detailed structure and composition of various layers of the electrochromic device, which are not repeatedly described herein for the sake of conciseness.

Figure 7:
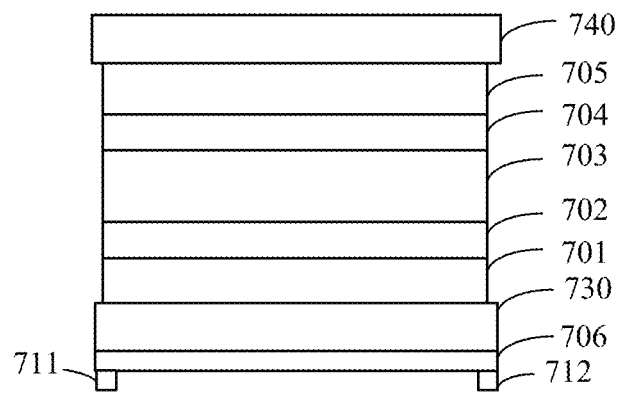
FIG. 7 is a schematic diagram illustrating an electrochromic device in accordance with one or more embodiments of this specification.

FIG. 7 is a schematic diagram illustrating an electrochromic device in accordance with one or more embodiments of this specification. As shown in FIG. 7, the electrochromic device 700 may include a bottom optical electrode layer 701; an electrochromic layer 702 on the bottom optical electrode layer 701; an electrolyte layer 703 on the electrochromic layer 702; a charge storage layer 704 on the electrolyte layer 703; and a top optical electrode layer 705 on the charge storage layer 704. A transition voltage may be applied between the top optical electrode layer 705 and the bottom optical electrode layer 701 to generate an electric field for inducing a change of the optical characteristics. Relevant parts in the foregoing embodiments may be referred to for details of this electrochromic device, which will not be repeatedly presented herein for the sake of conciseness.

In some embodiments, the electrochromic device 700 may further include a pair of transparent substrate (i.e., a bottom substrate 730 and a top substrate 740). The bottom optical electrode layer 701, the electrochromic layer 702, the electrolyte layer 703, the charge storage layer 704, and the top optical electrode layer 705 may be sandwiched by the bottom substrate 730 and the top substrate 740. The bottom substrate 730 and the top substrate 740 may be rigid substrates or flexible substrates, may have the same or different dimensions, and may comprise the same or different material, etc. Suitable material for the bottom substrate 730 and/or the top substrate 740 may include, but not limited to, glass, polymeric materials, Polyethylene terephthalate (PET), plastic materials, and/or other materials which are transparent in at least part of the visible region of the electromagnetic spectrum. In some embodiments, the bottom substrate 730 and the top substrate 740 may comprise glass.

In some embodiments, the electrochromic device 700 may further include one or more heater electrode layers dedicated for heat generation purpose. As shown in FIG. 7, a bottom heater electrode layer 706 may be provided on a side of the bottom substrate 730 opposing the bottom optical electrode layer 701. That is, the bottom heater electrode layer 706 and the bottom optical electrode layer 701 may be respectively provided on two opposing surfaces of the bottom substrate 730. Two first high conductive bars 711/712 may be respectively provided along two opposing edges of the bottom heater electrode layer 706 on a surface of the bottom heater electrode layer 706 away from the bottom substrate 730. A first thermal voltage may be applied between the two first high conductive bars 711 and 712 to generate a current within the bottom heater electrode layer 706, and the bottom heater electrode layer 706 may work as a heat generating element to heat the electrochromic device 700. The bottom heater electrode 706 and the bottom optical electrode layer 701 may be made of a same material or different materials, and this specification is not limited in this regard.

The electrochromic device 700 shown in FIG. 7 is similar to the electrochromic device 300 shown in FIG. 3. The difference between these two electrochromic devices is that, in the electrochromic device 700, the first high conductive bars 711/712 are respectively provided along two opposing edges of a dedicated electrode layer (i.e., the bottom heater electrode layer 706) for heat generation purpose. While in the electrochromic device 300, the high conductive bars are respectively provided along two opposing edges of the bottom electrode layer which also connects to a transition voltage and serves for inducing optical change purpose.

It should be understood that FIG. 7 only shows one heater electrode layer (i.e., the bottom heater layer 706) and is not intended to be limiting. In some embodiments, the electrochromic device may further include a top heater electrode layer (not shown in FIG. 7) on an exterior surface the top substrate 740. That is, the top heater electrode layer and the top optical electrode layer 705 may be respectively provided on two opposing surfaces of the top substrate 740. Two second high conductive bars (not shown in FIG. 7) may be respectively provided along two edges of the top heater electrode layer, and configured to, in response to a second thermal voltage applied on the second high conductive bars, generate a current in the top heater electrode layer to heat the electrochromic device 700. The two second high conductive bars may be attached to a surface of the top heater electrode layer away from the top substrate.

In some embodiments, the electrochromic device may include only the bottom heater electrode layer (and the associated high conductive bars), only the top heater electrode layer (and the associated high conductive bars), or both, and this specification is not limited in this regard.

In the electrochromic device disclosed in this specification, two high conductive bars may be respectively provided along two edges of the top electrode layer and/or bottom electrode layer. When a thermal voltage is applied on the two high conductive bars, the electrode layer(s) may work as heat generating element(s) to heat the electrochromic device. When the environmental temperature is lower than an optimal operating temperature, the heat generated by the electrode layer(s) may increase the operating temperature, thereby improving the switching speed and the performance of the electrochromic device.

Figure 8:
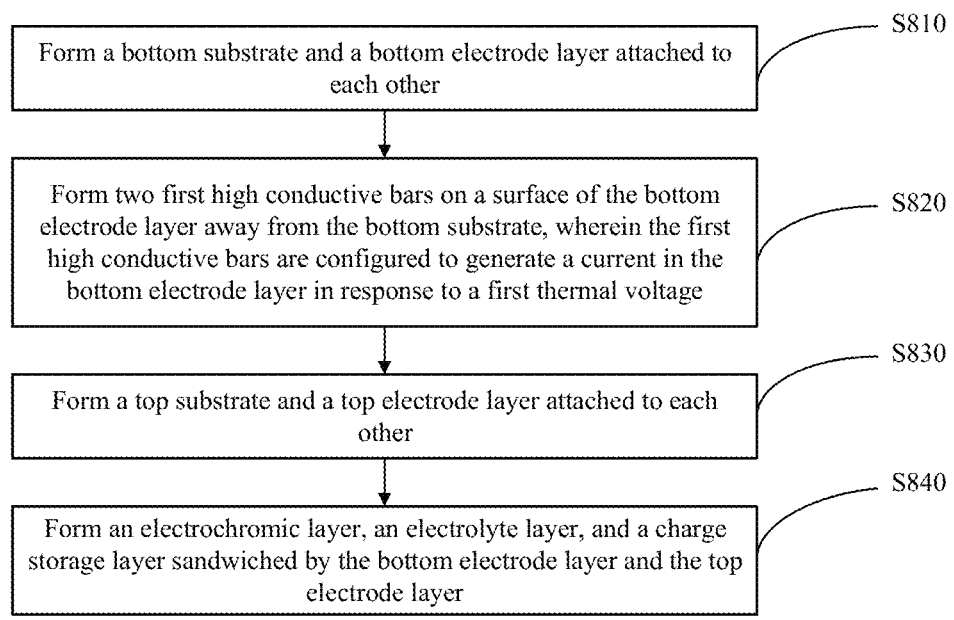
FIG. 8 is a flowchart illustrating a method of manufacturing an electrochromic device in accordance with one embodiment of this specification.

Based on the aforementioned electrochromic devices, this specification further provides an electrochromic device manufacturing methods. FIG. 8 is a flowchart illustrating a method of manufacturing an electrochromic device in accordance with one embodiment of this specification. This method will be described below in details with reference to FIG. 8.

Referring to FIG. 8, the manufacturing method may include the following steps S810 through S840.

In step S810, a bottom substrate and a bottom electrode layer may be formed. The bottom substrate may be attached to the bottom electrode layer.

In step S820, two first high conductive bar may be formed on a surface of the bottom electrode layer away from the bottom substrate. The two first high conductive bars may be configured to generate a current in the bottom electrode layer in response to a first thermal voltage applied on the first high conductive bars to heat the electrochromic device. More specifically, the two first high conductive bars may respectively be formed along two edges of the bottom electrode layer.

In step S830, a top substrate and a top electrode layer may be formed. The top substrate may be attached to the top electrode layer.

In step S840, an electrochromic, an electrolyte layer, and a charge storage layer that are sandwiched by the top electrode layer and the bottom electrode layer may be formed.

More specifically, step S840 may include the following sub-steps: forming an electrochromic layer on an interior surface of the bottom electrode layer; forming a charge storage layer on an interior surface of the top electrode layer; and forming an electrolyte layer disposed between the electrochromic layer and the charge storage layer and sandwiched by the electrochromic layer and the charge storage layer. The bottom electrode layer, the electrochromic layer, the electrolyte layer, the charge storage layer, and the top electrode layer may be sandwiched by the top substrate and the bottom substrate.

A transition voltage may be applied between the bottom electrode layer and the top electrode layer, and the optical transmittance of the electrochromic device may change in response to the transition voltage.

In some embodiments, the aforementioned method may further include steps to form two second high conductive bars on the top electrode layer. That is, the aforementioned method may further include: forming two second high conductive bars on a surface of the top electrode layer away from the top substrate. The second high conductive bars may be configured to generate a current in the top electrode layer in response to a second thermal voltage applied on the second high conductive bars to heat the electrochromic device. More specifically, the two second high conductive bars may be respectively formed along two edges of the top electrode layer.

In some embodiments, the first high conductive bars and the second high conductive bars may each made of a conductive paste, a conductive tape, or an embedded metal wire.

In some embodiments, the first high conductive bars may be formed along edges of the bottom electrode layer, respectively, and the second high conductive bars may be formed along edges of the top electrode layer, respectively.

In some embodiments, projections of the first high conductive bars and the second high conductive bars on a plane parallel with the bottom electrode layer may be separated from each other.

In some embodiments, the forming two first high conductive bars on a surface of the bottom electrode layer away from the bottom substrate may include: forming the two first high conductive bars parallel with each other and respectively along two opposing edges of the bottom electrode layer. The forming two second high conductive bars on a surface of the top electrode layer away from the top substrate may include: forming the two second high conductive bars parallel with each other and respectively along two opposing edges of the top electrode layer.

In another example, the forming two first high conductive bars on a surface of the bottom electrode layer away from the bottom substrate may include: forming the two first high conductive bars respectively along two adjacent edges of the bottom electrode layer. The forming two second high conductive bars on a surface of the top electrode layer away from the top substrate may include: forming the two second high conductive bars respectively along two adjacent edges of the top electrode layer.

In some embodiments, the top electrode layer and the bottom electrode layer may each have a square shape. The top electrode layer and the bottom electrode layer may have the same size or different sizes. This specification is not limited in this regard.

In some embodiments, a resistance between the two first high conductive bars may be in a range of 1-100$\Omega$, a resistance between the two second high conductive bars may be in a range of 1-100$\Omega$, and the first thermal voltage and the second thermal voltage may each be in a range of 1-100 V.

In some embodiments, the bottom electrode layer may include a bottom heater electrode layer and a bottom optical electrode layer. The forming a bottom substrate and a bottom electrode layer attached to each other may include: forming the bottom heater electrode layer and the bottom optical electrode layer respectively attached to two opposing surfaces of the bottom substrate. In one example, the bottom heater electrode layer may be attached to an exterior surface of the bottom substrate, and the bottom optical electrode layer may be attached to an interior surface of the bottom substrate. The forming two first high conductive bars on a surface of the bottom electrode layer away from the bottom substrate may include: forming the two first high conductive bars respectively along two edges of the bottom heater electrode layer on a surface of the bottom heater electrode layer away from the bottom substrate.

The top electrode layer may include a top optical electrode layer and a top heater electrode layer. The forming a top substrate and a top electrode layer attached to each other may include: forming a top heater electrode layer and a top optical electrode layer respectively attached to two opposing surfaces of the top substrate. In one example, the top heater electrode layer may be attached to an exterior surface of the top substrate, and the top optical electrode layer may be attached to an interior surface of the top substrate. The forming two second high conductive bars on a surface of the top electrode layer away from the top substrate may include: forming the two second high conductive bars respectively along two edges of the top heater electrode layer on a surface of the top heater electrode layer away from the top substrate. The transition voltage may be applied between the bottom optical electrode layer and the top electrode layer.

In some embodiments, the electrolyte layer may be a solid polymer electrolyte layer including one or more polar crystalline polymers and one or more polar amorphous polymers. A total amount of polar crystalline polymers may be in a range of 0 wt. % to 60 wt. % of a total weight of the solid polymer electrolyte layer. A total amount of polar amorphous polymers may be in a range of 0 wt. % to 70 wt. % of the total weight of the solid polymer electrolyte layer.

Relevant parts in the foregoing embodiments may be referred to for details of the electrochromic devices, which will not be repeatedly presented herein for the sake of conciseness.

It should be understood that the order these steps are presented in the above description is just one of various possible implementations, and is not intended to be limiting. Some or all of these steps may be performed simultaneously, and one or more steps may be performed in an order that is earlier than or later than the order specified in the above description. This specification is not limited in this regard.

In the manufacturing methods herein disclosed, two high conductive bars may be formed along two edges of the top electrode layer and/or the bottom electrode layer. When a thermal voltage is applied on the high conductive bars, the electrode layer(s) may work as heat generating element(s) to heat the electrochromic device. When the environmental temperature is lower than an optimal operating temperature, the heat generated by the electrode layer(s) may increase the operating temperature, thereby improving the switching speed and the performance of the electrochromic device.

Figure 9:
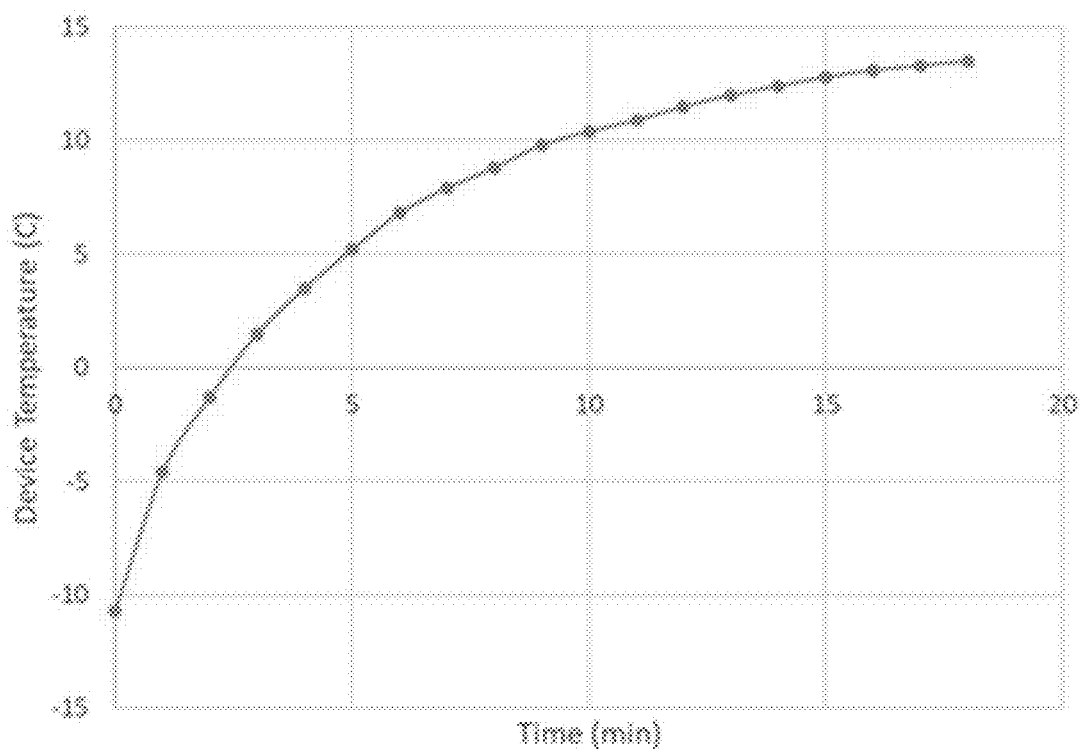
FIG. 9 is a diagram illustrating a change of device temperature over time for an electrochromic device in accordance with one or more embodiments of this specification.

FIG. 9 is a diagram illustrating a change of device temperature over time for an electrochromic device in accordance with one or more embodiments of this specification. In the example of FIG. 9, an electrochromic device is placed at an environmental temperature of −10° C. The resistance R of the electrode layer is around 8$\Omega$. When a thermal voltage of 15 V is applied on the high conductive bars on the electrode layer, the current on the electrode layer is measured at 1.88 A. As shown in FIG. 9, the device temperature is increased to above zero degree in a few minutes, indicating that the electrochromic device can effectively increase the operating temperature.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the appended claims, along with the full range of equivalents to which such claims are entitled.

What is claimed is:

1. An electrochromic device, comprising:
a bottom substrate and a bottom electrode layer attached to each other;
a top substrate and a top electrode layer attached to each other;
an electrochromic layer disposed on a first portion of an interior surface of the bottom electrode layer away from the bottom substrate;
a charge storage layer disposed on a first portion of an interior surface of the top electrode layer away from the top substrate;
an electrolyte layer disposed between the electrochromic layer and the charge storage layer and sandwiched by the electrochromic layer and the charge storage layer, wherein the bottom electrode layer, the electrochromic layer, the electrolyte layer, the charge storage layer, and the top electrode layer are sandwiched by the bottom substrate and the top substrate, the bottom electrode layer and the top electrode layer are configured to accept a transition voltage to cause a change on an optical transmittance of the electrochromic device, wherein the electrolyte layer comprises a solid polymer electrolyte, and the solid polymer electrolyte comprises one or more polar crystalline polymers of an average molecular weight of at least 10,000 Daltons and in a range of 0 wt, % to about 60 wt. % based on a total weight of the solid polymer electrolyte;
two first conductive bars disposed on a second portion of the interior surface of the bottom electrode layer away from the bottom substrate, wherein the first portion of the interior surface of the bottom electrode layer is different from the second portion of the interior surface of the bottom electrode layer, wherein the two first conductive bars are configured to, in response to a first thermal voltage applied on the first conductive bars, generate a current in the bottom electrode layer to change a temperature of the electrochromic device; and
two second conductive bars disposed on a second portion of the interior surface of the top electrode layer away from the top substrate, wherein the first portion of the interior surface of the top electrode layer is different from the second portion of the interior surface of the top electrode layer, wherein the two second conductive bars are configured to, in response to a second thermal voltage applied on the second conductive bars, generate a current in the top electrode layer to change the temperature of the electrochromic device, and
wherein, when viewed from a direction perpendicular to the interior surface of the bottom electrode layer, a projection of the first conductive bars on a plane parallel with the interior surface of the bottom electrode layer is separated from a projection of the second conductive bars.

2. The electrochromic device of claim 1, wherein the first conductive bars and the second conductive bars are each made of a conductive paste, a conductive tape, or an embedded metal wire.

3. The electrochromic device of claim 1, wherein the first conductive bars are located along edges of the bottom electrode layer, respectively, and the second conductive bars are located along edges of the top electrode layer, respectively.

4. The electrochromic device of claim 1, wherein the two first conductive bars are parallel with each other and respectively located along two opposing edges of the bottom electrode layer, and the two second conductive bars are parallel with each other and respectively located along two opposing edges of the top electrode layer.

5. The electrochromic device of claim 1, wherein the two first conductive bars are respectively located along two adjacent edges of the bottom electrode layer, and the two second conductive bars are respectively located along two adjacent edges of the top electrode layer.

6. The electrochromic device of claim 1, wherein the electrolyte layer is a solid polymer electrolyte layer including one or more polar crystalline polymers and one or more polar amorphous polymers, and wherein a total amount of polar crystalline polymers is in a range of 0 wt. % to 60 wt. % of a total weight of the solid polymer electrolyte layer, and a total amount of polar amorphous polymers is in a range of 0 wt. % to 70 wt. % of the total weight of the solid polymer electrolyte layer.

7. An electrochromic device, comprising:
a bottom heater electrode layer and a bottom optical electrode layer respectively attached to an exterior surface and an interior surface of a bottom substrate;
a top heater electrode layer and a top optical electrode layer respectively attached to an exterior surface and an interior surface of a top substrate;
an electrochromic layer disposed on an interior surface of the bottom electrode layer;
a charge storage layer disposed on an interior surface of the top electrode layer;
an electrolyte layer disposed between the electrochromic layer and the charge storage layer and sandwiched by the electrochromic layer and the charge storage layer, wherein the bottom optical electrode layer, the electrochromic layer, the electrolyte layer, the charge storage layer, and the top optical electrode layer are sandwiched by the bottom substrate and the top substrate, the bottom optical electrode layer and the top optical electrode layer are configured to accept a transition voltage to cause a change on an optical transmittance of the electrochromic device, wherein the electrolyte layer comprises a solid polymer electrolyte, and the solid polymer electrolyte comprises one or more polar crystalline polymers of an average molecular weight of at least 10,000 Daltons;

two first conductive bars located on a surface of the bottom electrode layer away from the bottom substrate, wherein the two first conductive bars are configured to, in response to a first thermal voltage applied on the first conductive bars, generate a current in the bottom electrode layer to change a temperature of the electrochromic device; and two second conductive bars located on a surface of the top electrode layer away from the top substrate, wherein the two second conductive bars are configured to, in response to a second thermal voltage applied on the second conductive bars, generate a current in the top electrode layer to change the temperature of the electrochromic device, and wherein, when viewed from a direction perpendicular to the surface of the bottom electrode layer, a projection of the first conductive bars on a plane parallel with the surface of the bottom electrode layer is separated from a projection of the second conductive bars.

8. The electrochromic device of claim 7, wherein the first conductive bars and the second conductive bars are each made of a conductive paste, a conductive tape, or an embedded metal wire.

9. The electrochromic device of claim 7, the first conductive bars are located along edges of the bottom heater electrode layer, respectively, and the second conductive bars are located along edges of the top heater electrode layer, respectively.

10. The electrochromic device of claim 7, wherein the electrolyte layer is a solid polymer electrolyte layer including one or more polar crystalline polymers and one or more polar amorphous polymers, and wherein a total amount of polar crystalline polymers is in a range of 0 wt. % to 60 wt. % of a total weight of the solid polymer electrolyte layer, and a total amount of polar amorphous polymers is in a range of 0 wt. % to 70 wt. % of the total weight of the solid polymer electrolyte layer.

11. An electrochromic device manufacturing method, comprising:

forming a bottom substrate and a bottom electrode layer attached to each other;

forming two first conductive bars on a surface of the bottom electrode layer away from the bottom substrate;

forming a top substrate and a top electrode layer attached to each other;

forming an electrochromic layer, an electrolyte layer, and a charge storage layer sandwiched by the bottom electrode layer and the top electrode layer, wherein the electrolyte layer is sandwiched by the electrochromic layer and the charge storage layer, wherein the bottom electrode layer, the electrochromic layer, the electrolyte layer, the charge storage layer, and the top electrode layer are sandwiched by the bottom substrate and the top substrate, wherein the electrolyte layer comprises a solid polymer electrolyte, and the solid polymer electrolyte, comprises one or more polar crystalline polymers of an average molecular weight of at least 10,000 Daltons;

wherein the two first conductive bars are configured to, in response to a first thermal voltage applied on the first conductive bars, generate a current in the bottom electrode layer to change a temperature of the electrochromic device, the bottom electrode layer and the top electrode layer are configured to accept a transition voltage to cause a change on an optical transmittance of the electrochromic device; and forming two second conductive bars on a surface of the top electrode layer away from the top substrate, wherein the two second conductive bars are configured to, in response to a second thermal voltage applied on the second conductive bars, generate a current in the top electrode layer to change the temperature of the electrochromic device, and wherein, when viewed from a direction perpendicular to the surface of the bottom electrode layer, a projection of the first conductive bars on a plane parallel with the surface of the bottom electrode layer is separated from a projection of the second conductive bars.

12. The method of claim 11, wherein the first conductive bars and the second conductive bars are each made of a conductive paste, a conductive tape, or an embedded metal wire.

13. The method of claim 11, wherein the first conductive bars are formed along edges of the bottom electrode layer, respectively, and the second conductive bars are formed along edges of the top electrode layer, respectively.

14. The method of claim 11, wherein the forming two first conductive bars on a surface of the bottom electrode layer away from the bottom substrate comprises:

forming the two first conductive bars parallel with each other and respectively along two opposing edges of the bottom electrode layer, and wherein the forming two second conductive bars on a surface of the top electrode layer away from the top substrate comprises:

forming the two second conductive bars parallel with each other and respectively along two opposing edges of the top electrode layer.

15. The method of claim 11, wherein the forming two first conductive bars on a surface of the bottom electrode layer away from the bottom substrate comprises:

forming the two first conductive bars respectively along two adjacent edges of the bottom electrode layer, and wherein the forming two second conductive bars on a surface of the top electrode layer away from the top substrate comprises:

forming the two second conductive bars respectively along two adjacent edges of the top electrode layer.

16. The electrochromic device of claim 7, wherein the one or more polar crystalline polymers are in a range of 0 wt. % to about 60 wt. % based on a total weight of the solid polymer electrolyte.

17. The method of claim 11, wherein the one or more polar crystalline polymers are in a range of 0 wt, % to about 60 wt. Io based on a total weight of the solid polymer electrolyte.

* * * * *

UNITED STATES PATENT AND TRADEMARK OFFICE
CERTIFICATE OF CORRECTION

| | | |
|---|---|---|
| PATENT NO. | : 11,493,817 B2 | |
| APPLICATION NO. | : 16/918419 | |
| DATED | : November 8, 2022 | |
| INVENTOR(S) | : Yan Zhou et al. | |

It is certified that error appears in the above-identified patent and that said Letters Patent is hereby corrected as shown below:

In the Claims

Claim 17, Column 20, Lines 58-59:
"0 wt, % to about 60 wt. Io" should read -- 0 wt. % to about 60 wt. % --.

Signed and Sealed this
Twenty-fifth Day of April, 2023

*Katherine Kelly Vidal*

Katherine Kelly Vidal
*Director of the United States Patent and Trademark Office*